(12) United States Patent
Monson

(10) Patent No.: US 12,248,648 B2
(45) Date of Patent: *Mar. 11, 2025

(54) MAGNETICALLY CONDUCTIVE ELECTRICALLY INSULATING MATERIAL IN A CAPACITANCE MODULE

(71) Applicant: Cirque Corporation, Sandy, UT (US)

(72) Inventor: Brian Monson, Farmington, UT (US)

(73) Assignee: Cirque Corporation, Sandy, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/936,456

(22) Filed: Sep. 29, 2022

(65) Prior Publication Data

US 2024/0111387 A1   Apr. 4, 2024

(51) Int. Cl.
| | | |
|---|---|---|
| G06F 3/044 | (2006.01) | |
| H01G 4/08 | (2006.01) | |
| H01G 4/30 | (2006.01) | |
| H04B 5/00 | (2024.01) | |
| H04B 5/26 | (2024.01) | |

(52) U.S. Cl.
CPC ............. G06F 3/0443 (2019.05); H01G 4/08 (2013.01); H01G 4/30 (2013.01); H04B 5/26 (2024.01)

(58) Field of Classification Search
CPC ........ G06F 3/044; G06F 3/041; G06F 3/0443; H01G 4/08; H01G 4/30; H04B 5/0081
See application file for complete search history.

(56) References Cited

U.S. PATENT DOCUMENTS

| | | |
|---|---|---|
| 5,856,822 A | 1/1999 | Du |
| 6,188,391 B1 | 2/2001 | Seely |
| 6,380,930 B1 | 4/2002 | Van Ruymbeke |
| 8,743,083 B2 | 6/2014 | Zanone |
| 8,933,901 B2 | 1/2015 | Paulsen |
| 8,988,628 B2 | 3/2015 | Martisauskas |
| 9,178,267 B2 | 11/2015 | Yeh |
| 9,223,352 B2 | 12/2015 | Smith |
| 9,323,399 B2 | 4/2016 | Osoinach |
| 10,438,425 B2 | 10/2019 | McLeod |
| 10,606,323 B1 | 3/2020 | Chang |
| 10,877,616 B2 | 12/2020 | Liu |
| 10,924,856 B2 | 2/2021 | Liu |
| 2010/0257725 A1* | 10/2010 | Akiho .................. H01F 1/37 252/62.62 |
| 2011/0169770 A1 | 7/2011 | Mishina |
| 2011/0273382 A1 | 11/2011 | Yoo |
| 2012/0034888 A1 | 2/2012 | De Flaviis |
| 2012/0133597 A1 | 5/2012 | Chen |
| 2012/0146857 A1 | 6/2012 | Wang |
| 2013/0162594 A1* | 6/2013 | Paulsen ................. H01Q 1/22 345/173 |
| 2013/0229362 A1* | 9/2013 | Liu ....................... G06F 3/041 345/173 |
| 2013/0285797 A1 | 10/2013 | Paulsen |
| 2014/0111474 A1 | 4/2014 | Bytheway |

(Continued)

FOREIGN PATENT DOCUMENTS

TW     201339942 A  * 10/2013

*Primary Examiner* — Md Saiful A Siddiqui

(57) ABSTRACT

A capacitance module may include a stack of layers, the stack including a first substrate and at least one capacitance sensing electrode on the substrate. The capacitance module may also include a magnetically conductive, electrically insulating material incorporated into the capacitance module.

18 Claims, 13 Drawing Sheets

(56) References Cited

U.S. PATENT DOCUMENTS

| | | | |
|---|---|---|---|
| 2014/0253830 A1 | 9/2014 | Li | |
| 2015/0311960 A1* | 10/2015 | Samardzija | H01Q 1/273 |
| | | | 455/90.3 |
| 2016/0124574 A1 | 5/2016 | Rouaissia | |
| 2018/0032166 A1 | 2/2018 | Orihara | |
| 2019/0148988 A1 | 5/2019 | Hwang | |
| 2019/0165609 A1* | 5/2019 | An | B60L 53/12 |
| 2019/0372196 A1* | 12/2019 | Aso | H04B 5/26 |
| 2023/0004193 A1* | 1/2023 | Cho | G06F 1/1656 |
| 2023/0125764 A1* | 4/2023 | Kim | G06F 3/0441 |
| | | | 345/173 |

* cited by examiner

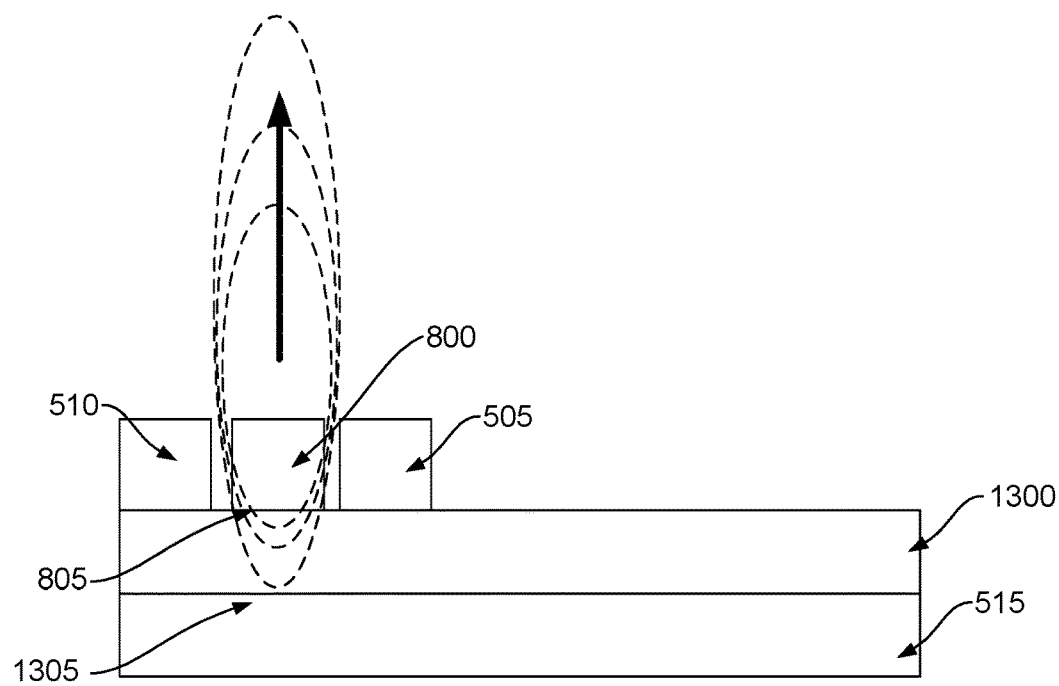
Fig. 13a
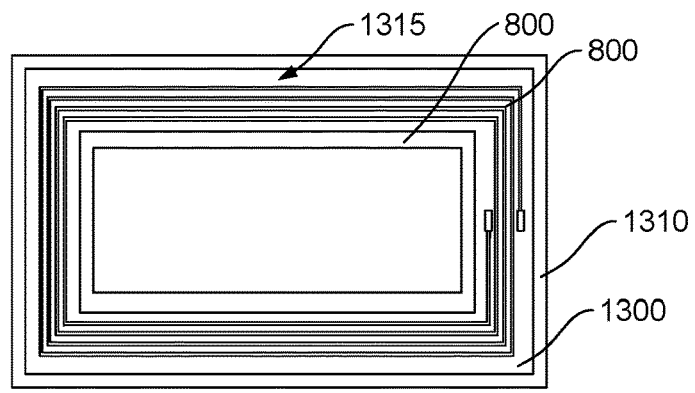
Fig. 13b
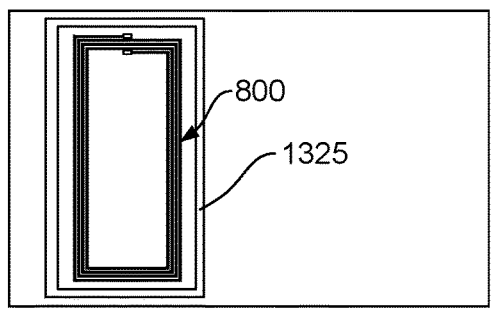 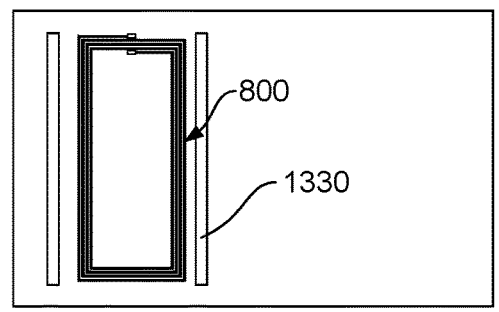
Fig. 13c  Fig. 13d

MAGNETICALLY CONDUCTIVE ELECTRICALLY INSULATING MATERIAL IN A CAPACITANCE MODULE

CROSS REFERENCE TO RELATED APPLICATIONS

This application is a continuation-in-part of U.S. patent application Ser. No. 17/873,613 titled Antenna Shielding in a Capacitance Module filed on Jul. 26, 2022. U.S. patent application Ser. No. 17/873,613 is herein incorporated by reference for all that it discloses.

FIELD OF THE DISCLOSURE

This disclosure relates generally to systems and methods for capacitance modules, such as a touch pad. In particular, this disclosure relates to systems and methods for enabling radio frequencies to transmit and receive at the touch pad.

BACKGROUND

Touch pads are often included on processor-based devices, such as laptop computers or the like, in order to allow a user to use fingers, styli, or the like as a source of input and selection. Additionally, processor-based devices often include radio frequency (e.g., 3 MHz-30 GHz) transmitters, receivers, transceivers, or the like (collectively, "transceivers" herein) for Wi-Fi, Bluetooth, near field communications (NFC), or the like. However, capacitive touch pads often use electrical shielding to prevent noise from the processor-based device from interfering with normal touch pad functions. When in proximity to the radio transceiver, that shielding may prevent transmission and reception of the radio frequencies.

For example, the opening in the chassis for a touchpad of a processor-based device (such as a laptop) may be in the only opening in the chassis, which allow sending and receiving Wi-Fi or NFC communications. Existing devices may place the radio frequency antenna near (e.g., adjacent) the touch pad to allow some of the radio frequencies through the shielding. However, this approach often requires tuning the antenna, which is often difficult. Further, the antenna system may use more power to transmit the signal around the components of the touchpad and the performance of the touch pad may be affected. Additionally, the above-described system may be more difficult to manufacture due to variations in the touch pad printed circuit board (PCB) affecting the antenna resonance. Other drawbacks, inconveniences, and issues with existing devices and methods also exist.

SUMMARY

In one embodiment, a capacitance module includes a stack of layers. The stack of layers may include a first substrate; at least one capacitance sensing electrode on the substrate; and a magnetically conductive, electrically insulating material incorporated into at least one of the layers.

The module may include an antenna incorporated into the stack of layers.

The antenna may be an inductive-type antenna.

The antenna may be a near field antenna.

The antenna may be on the same substrate with at least one capacitance sensing electrode.

The magnetically conductive, electrically insulating material may partially envelops the antenna.

The magnetically conductive, electrically insulting material may be a dielectric layer.

The antenna may be on a different layer than the magnetically conductive, electrically insulating material.

The stack of layers may include a second substrate and the magnetically conductive, electrically insulating layer electrically may isolate the first substrate from the second substrate.

The magnetically conductive, electrically insulating layer may include ferrite.

The stack of layers may include a ground plane layer made of an electrically conductive material.

The magnetically conductive, electrically insulating material may shield the ground plane layer from an antenna.

The magnetically conductive, electrically insulating material may redirect an inductive signal of an inductive-type antenna through a capacitance reference surface adjacent the stack of layers.

In one embodiment, a capacitance module may include a stack of layers. The stack may include a first substrate; at least one capacitance sensing electrode on the substrate; a near field antenna incorporated into the stack of layers; and a magnetically conductive, electrically insulating material incorporated into at least one of the layers.

The near field antenna may be on the same substrate with at least one capacitance sensing electrode.

The magnetically conductive, electrically insulating material may partially envelop the near field antenna.

The magnetically conductive, electrically insulting material may be a dielectric layer.

The stack of layers may include a ground plane layer made of an electrically conductive material.

The magnetically conductive, electrically insulating material may redirect a magnetic field of near field antenna through a capacitance reference surface adjacent the stack of layers.

In one embodiment, a capacitance module may include a stack of layers. The stack may include a first substrate; a second substrate; a magnetically conductive, electrically insulating material incorporated between the first substrate and the second substrate; and at least one capacitance sensing electrode on either the first substrate, the second substrate, or both.

In one embodiment, a device may include a stack of layers. The stack may include a first layer; a second layer; a magnetically conductive, electrically insulating material incorporated between the first layer and the second layer; and at least one capacitance electrode on either the first substrate, the second substrate, or both.

The first layer may be a capacitance reference surface.

The device may further include an antenna that may be deposited on the same layer as the magnetically conductive electrically insulating material.

In one embodiment, a capacitance module may include a stack of layers where the stack includes a substrate; at least one capacitance sensing electrode on the substrate; a near field antenna incorporated into the stack of layers; and a magnetically conductive, electrically insulating material incorporated into the stack.

In one embodiment, a capacitance module may include a stack of layers where the stack includes a first substrate; and at least one capacitance sensing electrode on the substrate; and where the capacitance module may include a magnetically conductive, electrically insulating material incorporated into the capacitance module.

In one embodiment, a capacitance module may include a substrate; at least one capacitance sensing electrode on the substrate; an antenna adjacent a first side of the substrate; and a magnetically conductive, electrically insulating material adjacent to a second side of the substrate; wherein the second side of the substrate is opposite to the first side of the substrate.

The module may include an electrically conductive shield that is adjacent the magnetically conductive, electrically insulating material.

The magnetically conductive, electrically insulating material may be between the antenna and electrically conductive shield.

The magnetically conductive, electrically insulating material may be a coating on an electrically conductive shield.

The module may include an electrically conductive shield where the magnetically conductive, electrically insulating material is between the electrically conductive shield and the antenna.

In some embodiments, a capacitance module may include a substrate; a capacitance sensing electrode on the substrate; a shield made of a first material that reduces at least some noise at the capacitance sensing electrode; and a second material adjacent to the substrate that at least reduces a formation of eddy currents in the shield.

The second material may eliminate the formation of eddy currents in the shield.

The first material may be an electrically conductive material.

The second material may be a magnetically conductive, electrically insulating material.

The second material may be a composite.

The composite may include a magnetically conductive material suspended in an electrically insulating material.

The composite may include a magnetically conductive coating on an electrically insulating material.

The second material may include ferrite.

The second material may have the characteristic of redirecting magnetic fields.

The second material may have the characteristic of repelling magnetic fields.

The second material may have the characteristic of absorbing magnetic fields.

BRIEF DESCRIPTION OF THE DRAWINGS

FIG. 13a depicts an example of a magnetically conductive, electrically insulating material partially encompassing an antenna in accordance with the disclosure.

FIG. 13b depicts an example of magnetically conductive, electrically insulating material surrounding an interior and exterior perimeter of an antenna in accordance with the disclosure.

FIG. 13c depicts an example of magnetically conductive, electrically insulating material surrounding an exterior perimeter of an antenna in accordance with the disclosure.

FIG. 13d depicts an example of magnetically conductive, electrically insulating material adjacent to an exterior perimeter of an antenna in accordance with the disclosure.

Figure 1:
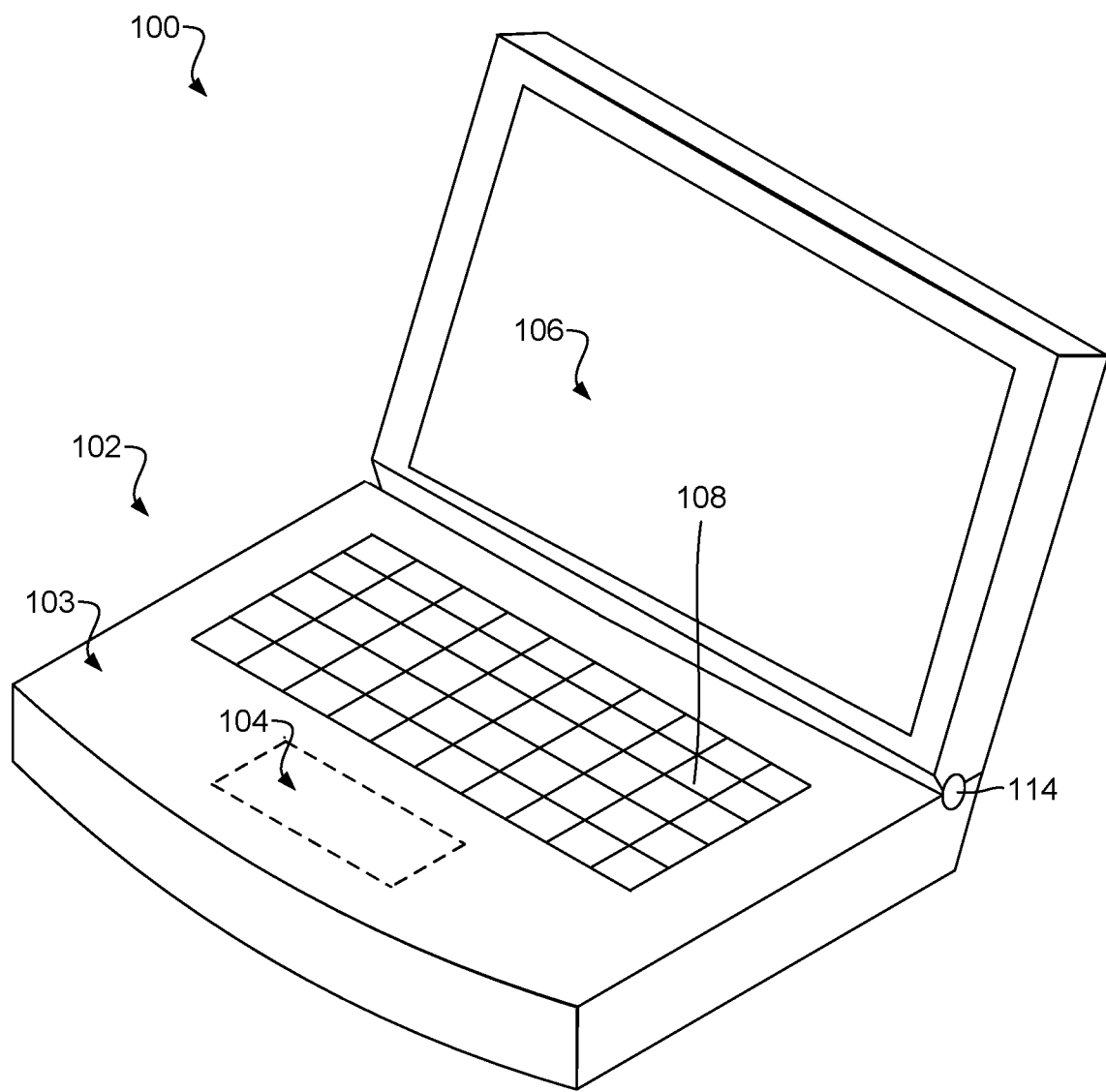
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "near field antenna" may generally refer to an antenna that is configured to operate using a near field communication (NFC) protocol. In some cases, NFC operates in a relatively close range of less than 5 inches, 4 inches, less than 2 inches, less and an inch or another relatively close range. NFC may be based on inductive coupling between two near field antennas communicating in one or both directions. In some cases, NFC may use a frequency of 13.56 MHz band, but any appropriate frequency may be used.

For the purposes of this disclosure, the term "magnetically conductive, electrically insulating (MCEI) material" may generally refer to any appropriate material that is generally magnetically conductive and electrically insulating. In one example, the MCEI material may have a magnetic permeability greater than air. In some cases, the MCEI has a magnetic permeability sufficiently high to keep the magnetic field out of the ground plane of the stack of layers and yet sufficiently low to minimize losses due to magnetic hysteresis. Preferably, the magnetic permeability of the MCEI material is more than ten time that of air, more than 20 times that of air, more than 40 times that of air, more than 100 times that of air, or another appropriate magnetic permeability. In some cases, the magnetic permeability is less than about 2,000. In some cases, the magnetic permeability is less than about 800. In some cases, the MCEI material has a magnetic permeability of about 125.

In some cases, the MCEI material has an electrical resistivity that is around about 12 micro-ohm cm. In some cases, the MCEI has an electrical resistivity greater than about one million ohm-cm.

The MCEI element may be made from a single material. In some cases, the MCEI material is ferrite. Ferrite may be a ceramic-like material. Ferrite may be iron-containing and made up of a large number of small crystals. Ferrite may include iron oxide and other metals, including magnesium, aluminum, barium, manganese, copper, nickel, cobalt, another metal, or even iron itself.

In some cases, the MCEI material is a composite of individual materials that are collectively magnetically conductive and electrically insulating. For example, the material can be made from a matrix of magnetically conductive particles and also electrically insulating particles where the overall matrix prevents the conduction of electrical currents while promoting the conduction of a magnetic current. One such material that includes ferromagnetic metal particles molded in a polymer matrix is known as "powdered iron" and may be a suitable MCEI material.

In some cases, the MCEI material contains ferrite, iron, alloys of iron, mixtures of iron with other compounds, or combinations thereof. In some examples, the MCEI may include partially magnetic materials, paramagnetic materials, ferromagnetic materials, diamagnetic materials, permanent magnetic materials, magnetic absorbing materials, hard magnetic materials, soft magnetic materials, alloys thereof, mixtures thereof, composites thereof, or combinations thereof. In some cases, the MCEI material may include iron, cobalt, nickel, bismuth, tungsten, tin, titanium, pyrolytic graphite, barium hexaferrite, rare earth elements samarium, dysprosium, neodymium, aluminum, samarium cobalt, flexible rubber, alnico, strontium, barium, manganese, zinc, other metals with similar electrical properties, other metals, or combinations thereof. In some case, the MCEI material includes laminated magnetic materials, which may include magnetic sheets that are separated by an insulating layer.

In some cases, the MCEI material may be deposited on a substrate in the stack of layers. In other examples, the MCEI material may formed separately and connected to the substrate. In some cases, the substrates in the stack of layers are separated with a dielectric. In such examples, at least one of the dielectrics may include the MCEI material. In some cases, the substrate itself may have magnetically conductive and electrically insulating materials, and therefore may be the MCEI material. In other examples, the MCEI material may be positioned adjacent to a shield layer of the stack of layer where the shield layer includes copper intended to shield the capacitance electrodes from electric noise. The MCEI material may be positioned within the stack of layers to protect the shield layer from forming eddy currents which may be generated by an inductive component or inductive components incorporated into the capacitance module. An example of an inductive element that may be near or incorporated into the capacitance module is an inductive type of antenna. In some cases, the inductive-type of antenna may operate on a NFC protocol, but the inductive-type of antenna may operate based on any appropriate type of protocol.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
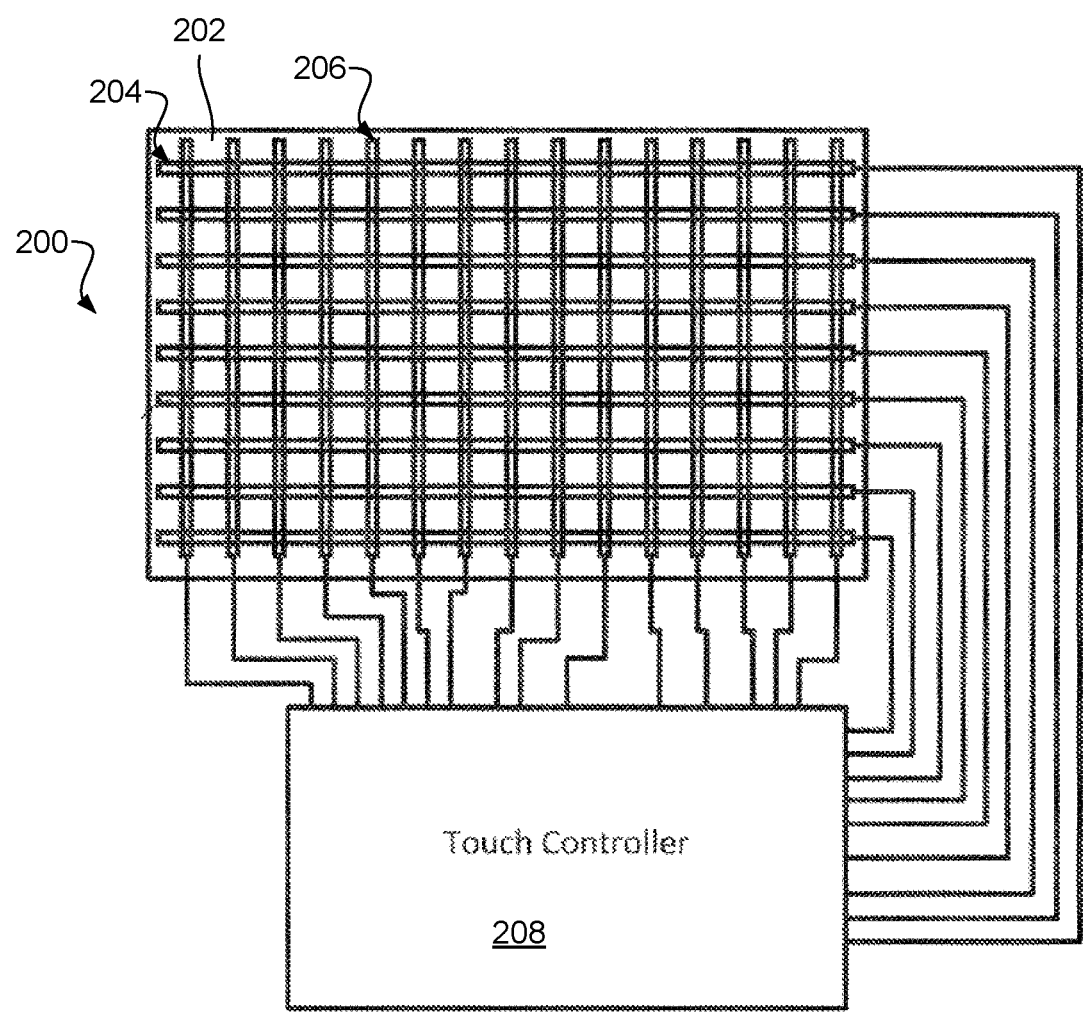
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
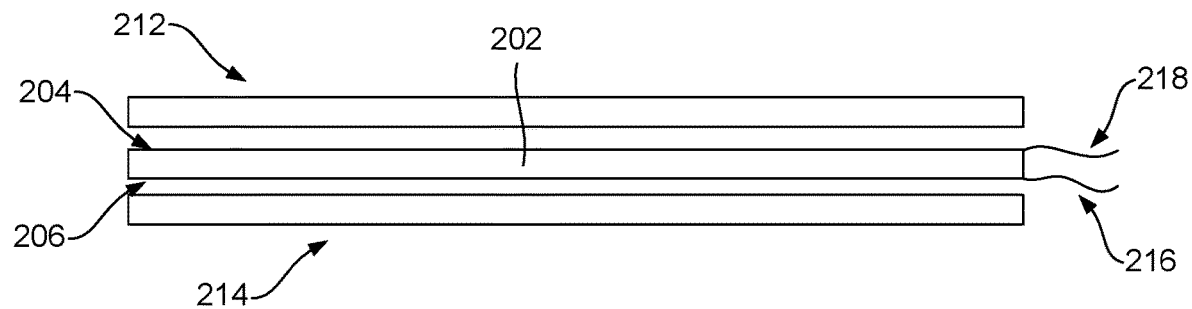
FIG. 3 depicts an example of a touch pad in accordance with the disclosure.

104 FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
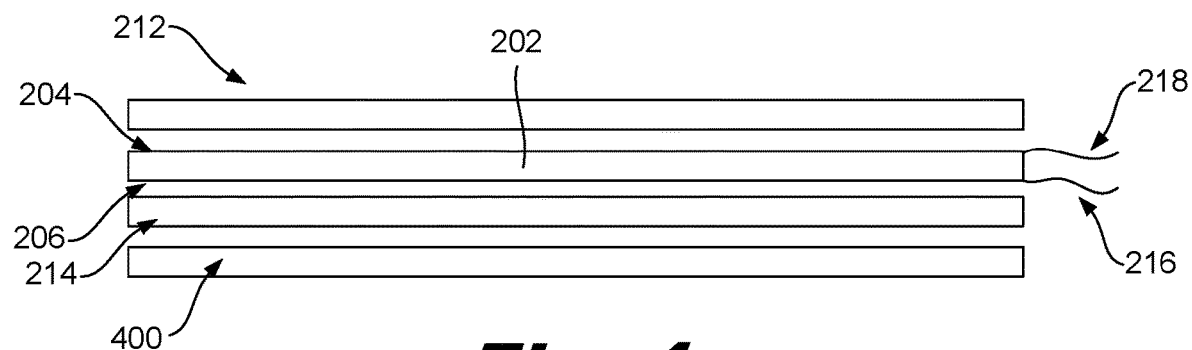
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
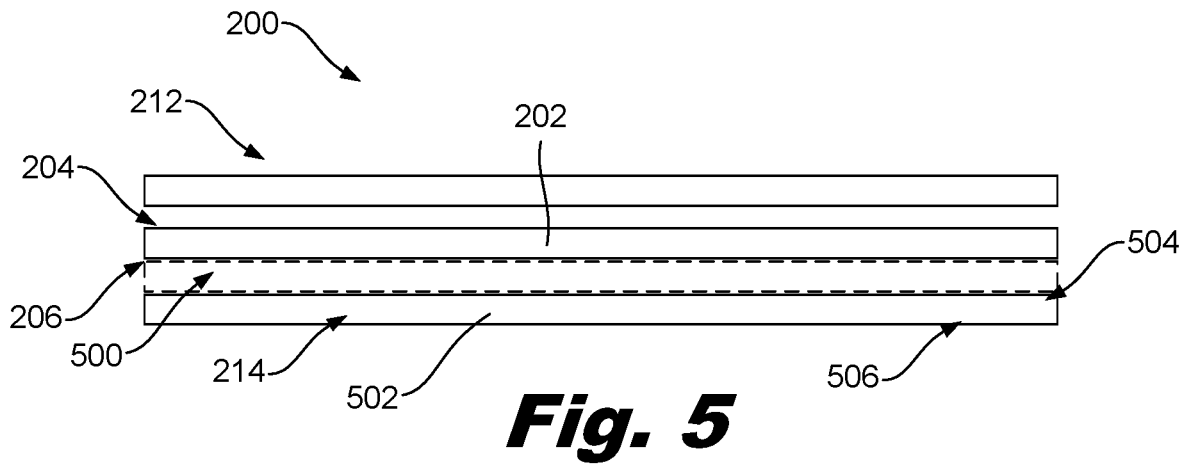
FIG. 5 depicts an example of a magnetically conductive, electrically insulating material in a capacitance module in accordance with the disclosure.

FIG. 5 depicts an example of a stack of layers in a capacitance module 200. In this example, a capacitance reference surface 212 is depicted as part of the capacitance module 200, but in some examples, the capacitance reference surface is not part of the capacitance module.

Also depicted in the illustrated example is a single substrate 202 on which capacitance electrodes for creating changes in capacitance and measuring capacitance are deposited. In some cases, the capacitance electrodes are deposited on both sides 204, 206 of the substrate 202, but in other examples, the capacitance electrodes are primarily deposited on a single side.

A shield layer 214 is located adjacent to the substrate 202 with the capacitance electrodes. In some examples, the shield layer 214 includes a second substrate 502 and has a copper layer or a layer of another metal deposited on the first side 504 of the second substrate 502.

Components like memory, traces, resistors, and other components that may be used to operate the capacitance module may be located on a second side 506 of the second substrate 502. However, in other examples, the components may be connected to a third substrate that is adjacent to the second substrate. In some cases, the third substrate may be dedicated to the components for operating the capacitance module 200.

Figure 6:
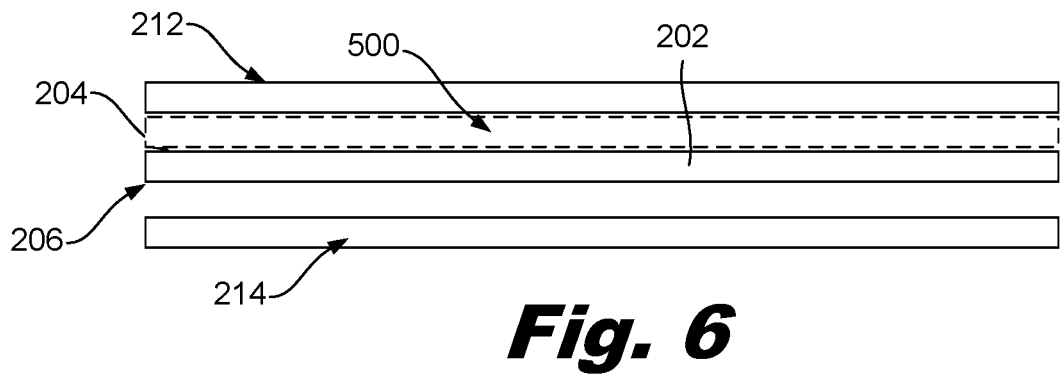
FIG. 6 depicts an example of a magnetically conductive, electrically insulating material in a capacitance module in accordance with the disclosure.
Figure 7:
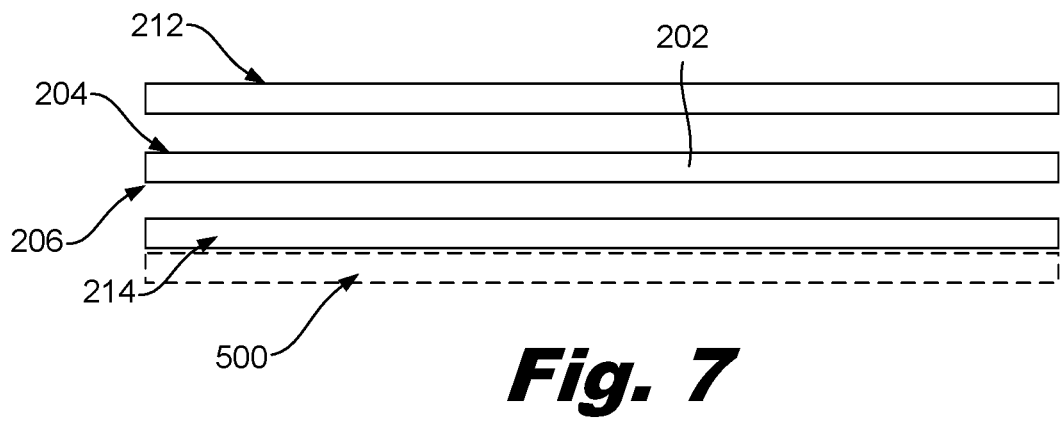
FIG. 7 depicts an example of a magnetically conductive, electrically insulating material in a capacitance module in accordance with the disclosure.

In the illustrated example of FIG. 5, a magnetically conductive, electrically insulating (MCEI) material 500 is located between the first and second substrates 502, 504. In some cases, the MCEI material is a dielectric material that is positioned between the substrates. In the example of FIG. 6, the MCEI material 500 is positioned between the first substrate and the capacitance reference surface 212. In both the examples of FIG. 5 and FIG. 6, the MCEI material 500 is placed above the shield layer 214. In FIG. 7, the MCEI material 500 is positioned adjacent to a second side 506 of the shield layer 214.

The MCEI material 500 may have the advantage of at least reducing inductive based eddy currents in the shield layer 214 or in the capacitance electrodes themselves. In some cases, inductive based interference causes noise in the capacitance electrodes thereby interfering with an ability to detect changes in capacitance. In some cases, the noise that affects the capacitance electrodes is from eddy currents that are formed in the shield. The shield may provide the benefit of blocking electrical inference from components like batteries, wi-fi antennas, and other electrical devices positioned near the capacitance module 200. However, inductive based components, like inductive-based antenna, may generate eddy currents in the shield that are strong enough that the shield becomes the source of electrical interference to the capacitance electrodes. However, since the MCEI material has at least a lower electrically conductivity than the shield's electrically conductive material, eddy currents either do not form on the MCEI material or it is much harder for eddy currents to form on the MCEI material. In some cases, the MCEI material has a lower electrical conductivity than the shield made of copper or another type of electrically conductive metal. At the same time, the ability of the MCEI material to conduct magnetism allows the MCEI material to shield magnetic fields. Thus, when an MCEI material is positioned between an inductive device and the shield layer 214, the MCEI material may block the shield layer from the magnetic fields generated by inductive device. As a result, the MCEI material can shield the capacitance electrodes, the shield layer, and any other component in the capacitance device from the inductive components in the capacitance module 200 or located near the capacitance module.

While the examples of FIGS. 5-7 depict the MCEI material as a dielectric between substrates, the MCEI material may be incorporated into the capacitance module through any appropriate way. For example, at least one of the substrates may be entirely or partially made of an MCEI material. In some cases, the MCEI material is deposited on the surface of at least one substrate.

The capacitance module may include a MCEI material in case the capacitance module is to be used near an inductive based device. In some examples, the MCEI material is incorporated into a location in the capacitance module to shield parts of the capacitance module from devices that are anticipated to be assembled near the capacitance module in a larger electronic device. For example, an inductive-type antenna may be incorporated into a mobile device, a laptop, a gaming device, a sensor, a kiosk, a screen, an auto dashboard, or another type of electronic device near where the capacitance module is to be incorporated into the device. In other examples, the inductive-type device may be incorporated into the capacitance module itself, and the MCEI material may be used to shield sensitive components of the capacitance module from the inductive-type devices. For example, an inductive-type of an antenna may be incorporated into the capacitance module and the MCEI material may shield other portions or components of the capacitance module from the magnetic fields generated by the inductive-type device.

Figure 8:
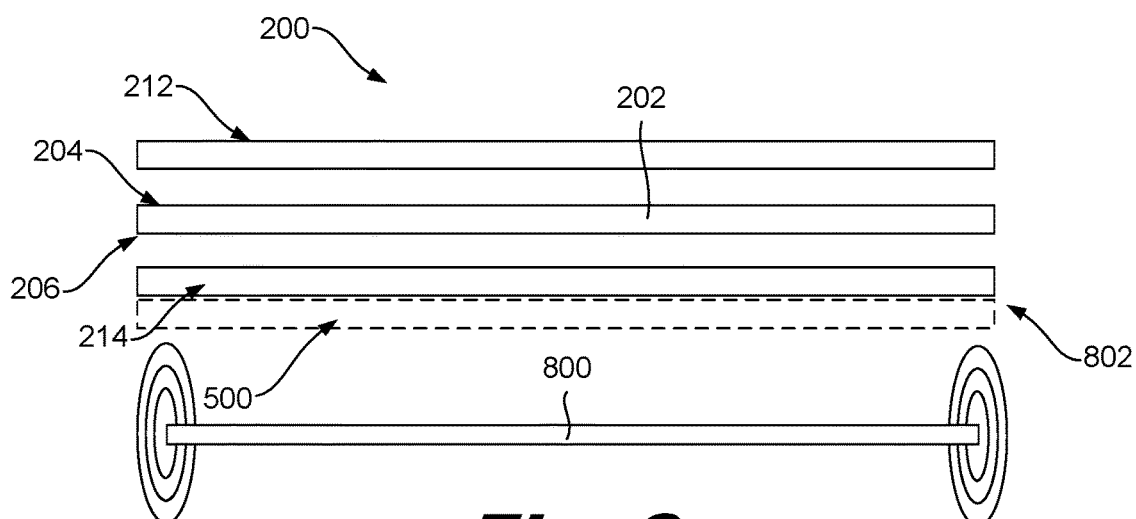
FIG. 8 depicts an example of a magnetically conductive, electrically insulating material in a capacitance module and an antenna near the stack of layers in accordance with the disclosure.
Figure 9:
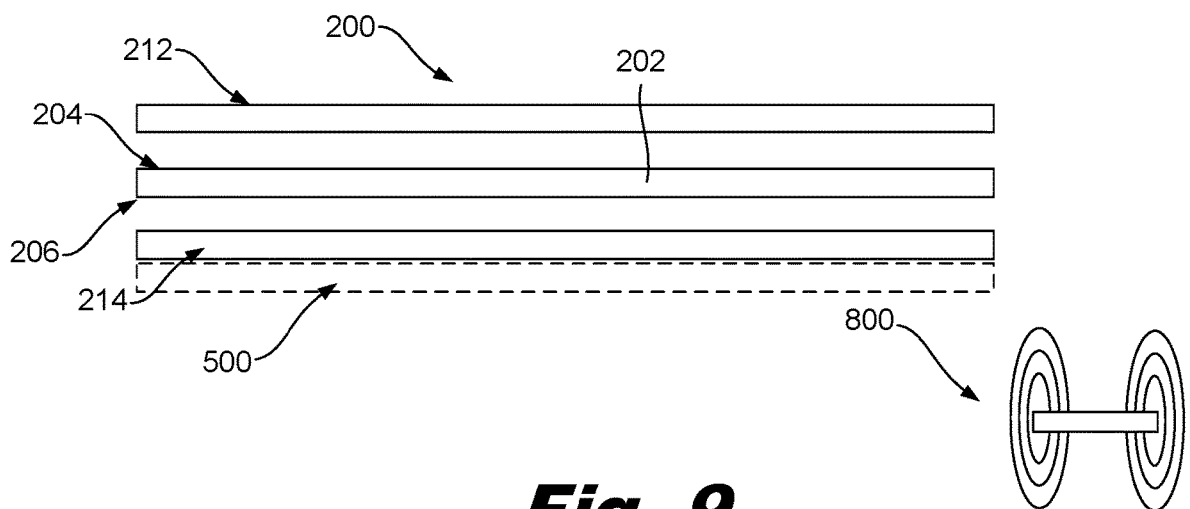
FIG. 9 depicts an example of a magnetically conductive, electrically insulating material in a capacitance module and an antenna near the stack of layers in accordance with the disclosure.
Figure 10:
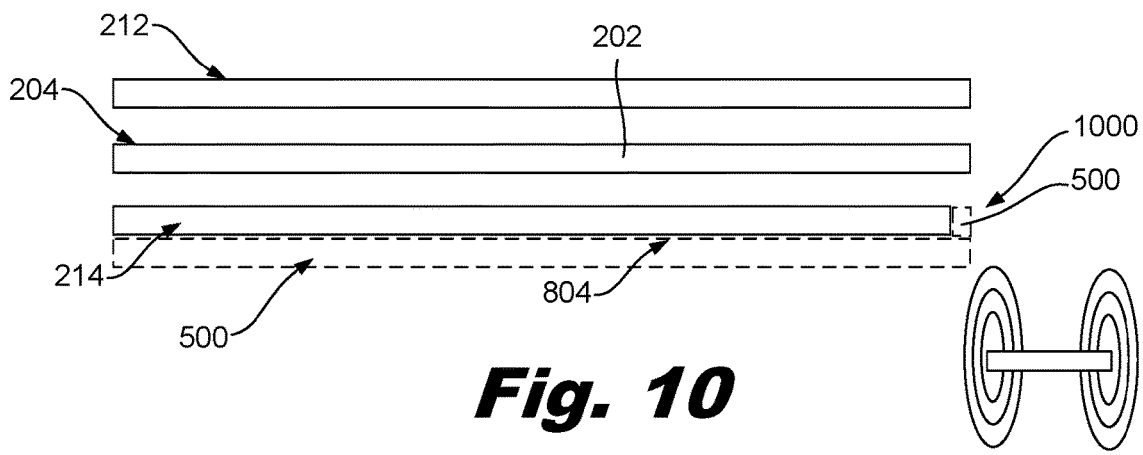
FIG. 10 depicts an example of a magnetically conductive, electrically insulating material in a capacitance module and an antenna near the stack of layers in accordance with the disclosure.

FIGS. 8-10 depict examples with an antenna 800 positioned near the capacitance module 200. In the example of FIG. 8, an antenna 800 is positioned adjacent an underside 802 of the capacitance module or in some cases, the underside of one of the layers of the capacitance module 200. An MCEI material 500 may be located between the shield layer 214 and the antenna 800. In the example of FIG. 9, an antenna 800 is located near a side of the capacitance module 200. A portion of the MCEI material 500 may be located between the shield layer 214 and the antenna 800. In the example of FIG. 10, the MCEI material 500 is located on the underside 804 of the shield layer 214 and also located on an edge 1000 of the perimeter of the shield layer 214. In this example, the MCEI material 500 is positioned to shield the shield layer 214 from multiple angles and/or sides from where the magnetic field may approach the shield layer 214.

Figure 11:
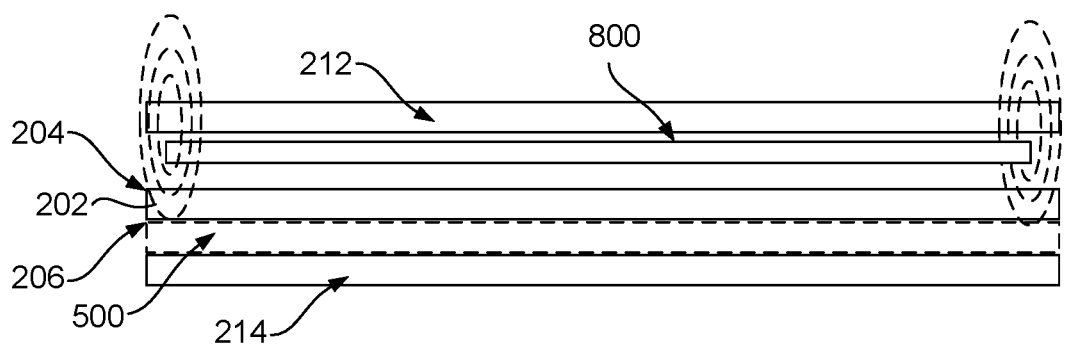
FIG. 11 depicts an example of a magnetically conductive, electrically insulating material and an antenna in a capacitance module in accordance with the disclosure.

FIG. 11 depicts an example of an antenna 800 located above the substrate 202 with the capacitance electrodes. Further, FIG. 11 also depicts an MCEI material 500 between the shield layer 214 and the layer 202 with the capacitance electrodes. In this example, the magnetic field generated by the antenna 800 can transmit a signal above the shield layer 214 and the capacitance electrodes. However, the MCEI material 500 may prevent the magnetic field from the antenna 800 from generating eddy currents in the shield layer 214. In some examples, the magnetic field by itself may not significantly interfere with the operation of the capacitance electrodes when the eddy currents are eliminated or at least reduced in the shield layer 214 by the MCEI material 500.

In some examples, the MCEI material 500 may redirect the magnetic field from the antenna 800 to focus the signal to go through the capacitance reference surface 212. In such an example with the magnetic field redirected, the antenna 800 may operate at a lower power to get the antenna's signal through the components of the capacitance module to a receiver located on the other side of the capacitance reference surface 212. Thus, in some examples, the MCEI materials 500 may permit power savings when operating an antenna 800.

In the example of FIG. 11, the magnetic field from the antenna may radiate through the substrate 202 with the capacitance electrodes. In some cases, the MCEI material is located adjacent an underside of substrate 202 and may prevent the magnetic field from moving past (or at least diminishing the strength of the magnetic field past) substrate 202. Thus, in some cases, the magnetic field is not detectable at the shield layer. In some cases, the magnetic field is detectable at the shield layer, but at a weaker strength than the strength of the magnetic field above the shield layer.

Although, in some cases, the magnetic field may pass through or by the capacitance electrodes, in some examples, the magnetic field may not generate eddy currents in the capacitance electrodes that are significant enough to negatively affect capacitance measurements with the capacitance electrodes. In some cases, the magnetic field may generate some interference at the capacitance electrodes, but the magnetic field may only generate less interference than would have been caused at the capacitance electrodes if the eddy currents had been allowed to be formed in the shield layer from the antenna.

The MCEI material may cause at least some of the strength of the magnetic field to move towards and through the capacitance reference surface. This may result in more of the antenna's signal being more focused in limited directions or in a single direction. Such a redirecting of the magnetic field may allow more of the antenna strength to pass through the reference capacitance surface with less energy input into the antenna than if there was not MCEI material in the capacitance module. In such an example, less energy may be necessary for the antenna's signal to be picked up by a receiving antenna that is outside of the electronic device that incorporates the capacitance module.

In some examples, the MCEI material may replace the shield layer. In such an example, the MCEI material may provide some protection from other sources that may cause electromagnetic interference with the capacitance electrodes. For example, the MCEI material may be used to weaken the electric field fluctuations from a battery that may be positioned adjacent to the capacitance module.

In other examples, an electrically conductive material may be deposited on a surface of the MCEI material making a composite shield that is electrically conductive on one side and electrically insulating on the other side. Such a composite shield may block electric fields on a first side and magnetic fields on a second side. Such a composite shield may effectively block the electric fields and magnetic fields.

Figure 12A:
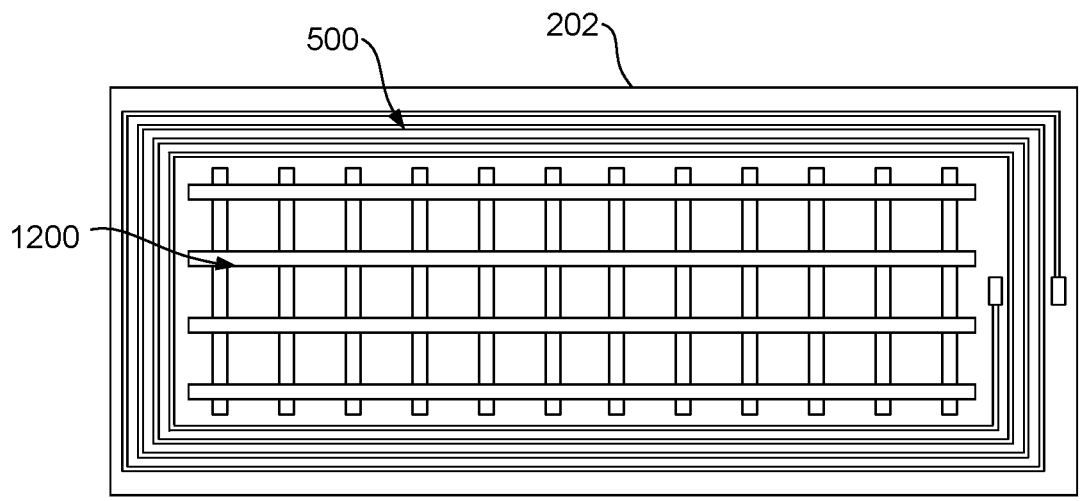
FIG. 12a depicts an example of an antenna on the same layer as at least one capacitance electrode in accordance with the disclosure.
Figure 12B:
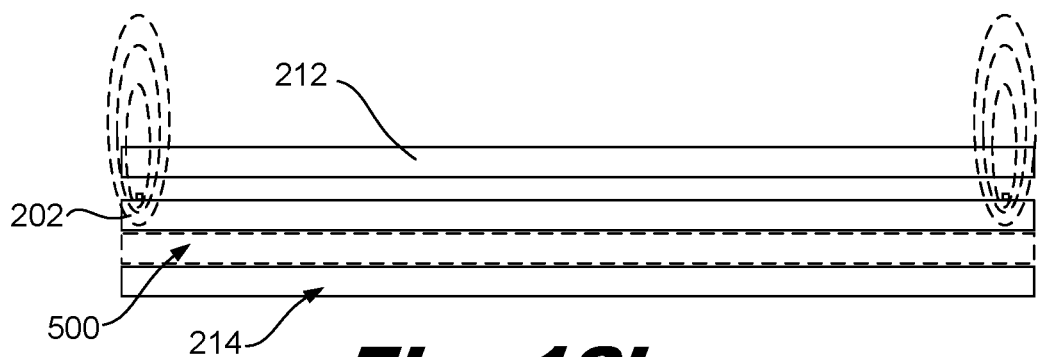
FIG. 12b depicts an example of a magnetically conductive, electrically insulating material and an antenna in a capacitance module in accordance with the disclosure.

FIG. 12a depicts an example of a layer 202 with capacitance electrodes 1200 and an antenna 800 positioned on the same layer 202. While this example depicts the antenna 800 surrounding the capacitance electrodes 1200, in other examples, the antenna 800 may only surround a portion of the capacitance electrodes 1200 or be positioned to the side of the capacitance electrodes 1200. FIG. 12b depicts an example where MCEI layer 500 is below the layer 202 with the capacitance electrodes 1200, and where the capacitance electrodes 1200 are on the same surface as the antenna 800.

FIG. 13a depicts an example of an antenna 800 on a substrate 1300, such as a substrate that is part of a stack of layers in a capacitance module. In this example, MCEI material is positioned adjacent to three sides of the antenna 800. A first portion 505 of MCEI material is positioned adjacent to a first side of the antenna 800, a second portion 510 of the MCEI material is positioned adjacent to a second side of the antenna 800, and a third portion 515 of the MCEI material is positioned adjacent an underside 805 of the antenna 800.

In the illustrated example, the first portion 505 of the MCEI material and the second portion 510 of the MCEI material may be part of a single continuous piece of MCEI material. In some cases, the first and second portions 505, 510 of the MCEI material has the same magnetically conductive and/or electrically insulating properties as each other, but in other examples, the first and second portions 505, 510 of the MCEI material may have different magnetically conductive and/or electrically insulating properties.

In the example depicted in FIG. 13a, the third portion 515 of the MCEI material is deposited on an underside 1305 of the substrate 1300. In this example, the third portion 515 of the MCEI material is shown covering the entire surface area of the substrate's underside 1305. However, in other examples, just a subsection of the substrate's underside may be covered with the MCEI material. In some examples, the third portion 515 of the MCEI material has the same magnetically conductive and/or electrically insulating properties as either the first portion 505 and/or the second portion 510 of the MCEI material. However, in other examples, the first and/or second portions 505, 510 of the MCEI material may have different magnetically conductive and/or electrically insulating properties than the third portion 515 of the MCEI material.

In some examples, the magnetic field generated by an inductive-type antenna may be redirected away from the MCEI material. Thus, as illustrated in the example of FIG. 13a, the magnetic field may be forced in a direction away from the first, second, and third portions 505, 510, 515 of the MCEI material. In this example, the magnetic field is redirected in the opposite direction of the substrate 1300 since the underside 1305 of the substrate is adjacent MCEI material 515. For example, the MCEI material 515 on the underside 1305 of the substrate 1300 may not allow the magnetic field to pass thereby forcing the magnetic field in another direction. In the example of FIG. 13a, the first portion 505 of the MCEI material may prevent the magnetic field from freely moving away from the first side of the antenna 800, and the second portion 510 of the MCEI material may prevent the magnetic field from freely moving away from the second side of the antenna 800. As a result, the magnetic field is directed primarily away from the antenna 800 from just one side of the antenna 800 thereby concentrating the influence of the magnetic field in a single direction. In examples where a capacitance reference surface 212 is positioned over a front side of the substrate 1300, the MCEI material may redirect the magnetic field of the antenna 800 through the capacitance reference surface 212.

FIG. 13b depicts an example of an antenna 800 deposited on a substrate 1300 with an outer ring 1310 made of a single piece of MCEI material surrounding an outside of the antenna 800. In this example, the outer ring 1310 of MCEI material and the antenna 800 are on the same surface 1315 of the substrate 1300. The outer ring 1310 of MCEI material may be used to direct the magnetic field of the antenna 800 in a pre-determined direction. In some cases, the underside of the substrate 1300 in the example of FIG. 13b is also adjacent to MCEI material. However, in other examples, the substrate in FIG. 13b is not adjacent to MCEI material. In other examples, other components of the capacitance module may be located on the substrate with the antenna depicted in FIG. 13b and the ring of MCEI material may direct the magnetic field of the antenna away from those components.

An inner ring 1320 of MCEI material is also depicted in the example of FIG. 13b. In this example, at least a portion of the inner ring 1320 is adjacent to an inside surface of the antenna 800. While the MCEI material in this example is depicted as a ring, in other examples, the MCEI material may be a solid material, a circular shape, a triangular shape, a square shape, an asymmetric shape, another type of shape, in segments, or combinations thereof. In some cases, having MCEI material adjacent an inside surface and adjacent an outside surface of an antenna may contribute to directing the magnetic field of the antenna.

FIG. 13c depicts an example where the MCEI material 1325 is adjacent to just an outside of the antenna 800. In the example of FIG. 13d, multiple segments 1330 of MCEI material is positioned adjacent to different sides of the antenna 800. In some cases, surrounding the entire perimeter of the antenna may not be necessary to achieve the desired shield effects and/or the desired focusing effects or redirecting the magnetic field. Thus, by using less MCEI material than necessary to completely surround the antenna, quicker manufacturing and lower material costs may be achieved.

Figure 14A:
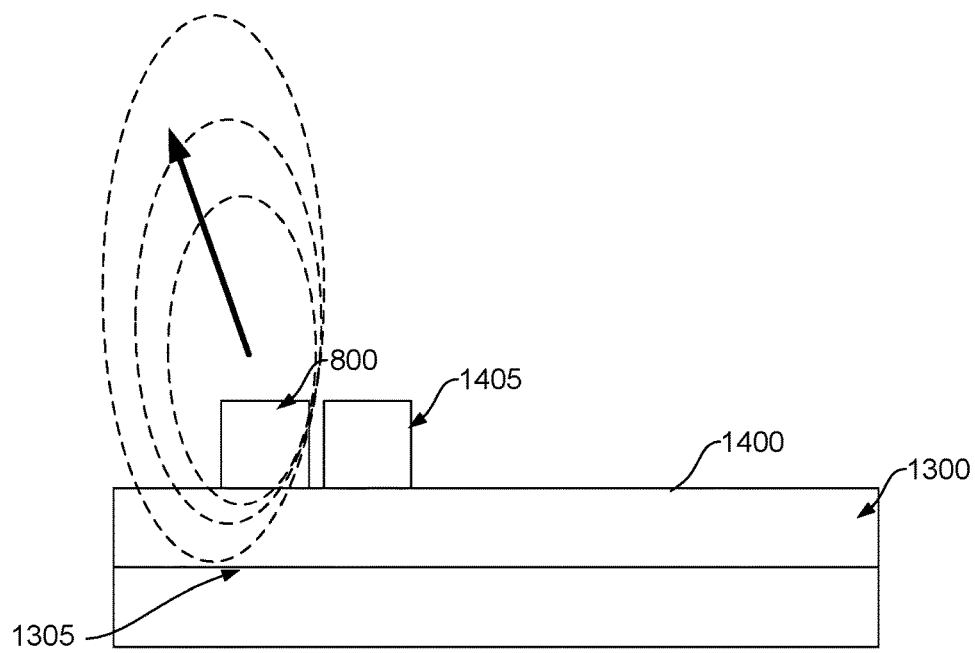
FIG. 14a depicts an example of a magnetically conductive, electrically insulating material partially encompassing an antenna in accordance with the disclosure.
Figure 14B:
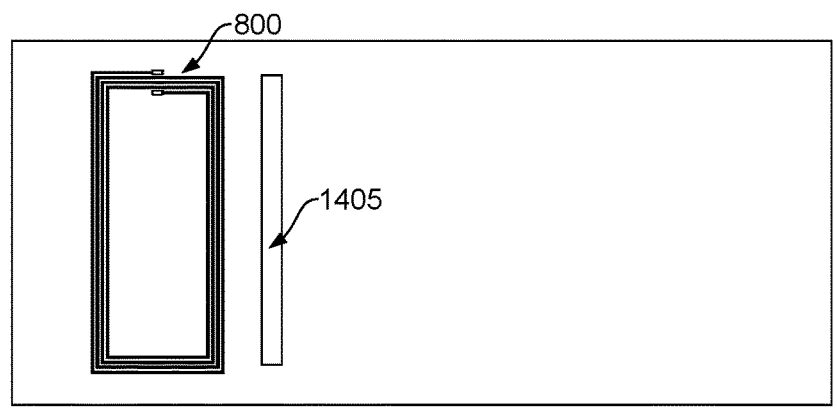
FIG. 14b depicts an example of a magnetically conductive, electrically insulating material adjacent to an antenna in accordance with the disclosure.
Figure 14C:
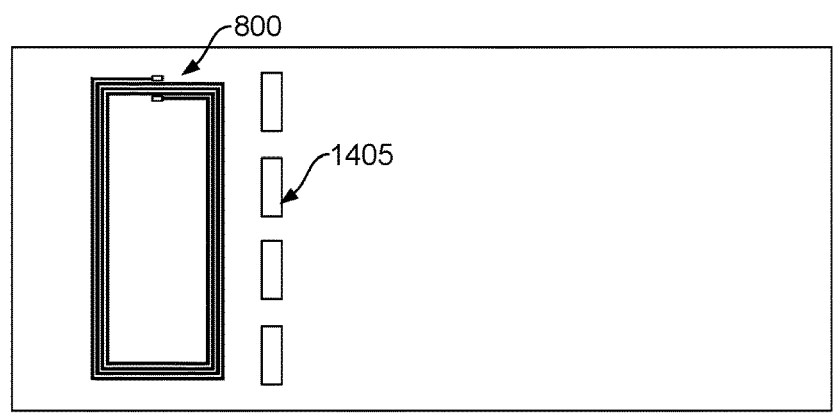
FIG. 14c depicts an example of segmented magnetically conductive, electrically insulating material partially encompassing an antenna in accordance with the disclosure.

FIG. 14a depicts an example of an antenna 800 disposed on a front surface 1400 of a substrate 1300. MCEI material 1405 is deposited on the underside 1305 of the substrate 1300, and MCEI material 1405 is deposited on just a single side of the antenna 800 on the front surface 1400 of the substrate 1300. In this example, the MCEI material on the underside 1305 of the substrate 1300 and the MCEI material on the front side 1400 of the substrate 1300 may be used to shield the desired components of the capacitance module and direct the magnetic field into a desired direction. In this example, the magnetic field is freer to move away from an outside perimeter of the antenna 800 than in the example depicted in FIG. 13a. FIG. 14b depicts a top view of the example of FIG. 14a. FIG. 14c depicts an alternative example where the MCEI material is segmented.

Figure 15:
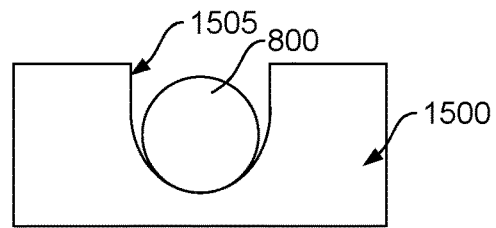
FIG. 15 depicts an example of a magnetically conductive, electrically insulating material forming a trough in accordance with the disclosure.

FIG. 15 depicts an example of a MCEI trough 1500 defining an inner channel 1505. The antenna 800 may be disposed within the inner channel 1505. The MCEI trough 1500 may be deposited or otherwise attached to a substrate of the capacitance module. The MCEI trough 1500 may prevent leakage of the magnetic field into the substrate and pass-through gaps in the MCEI coverage. In some cases, the MCEI trough 1500 may better focus the energy of the magnetic field in a single direction.

Figure 16A:
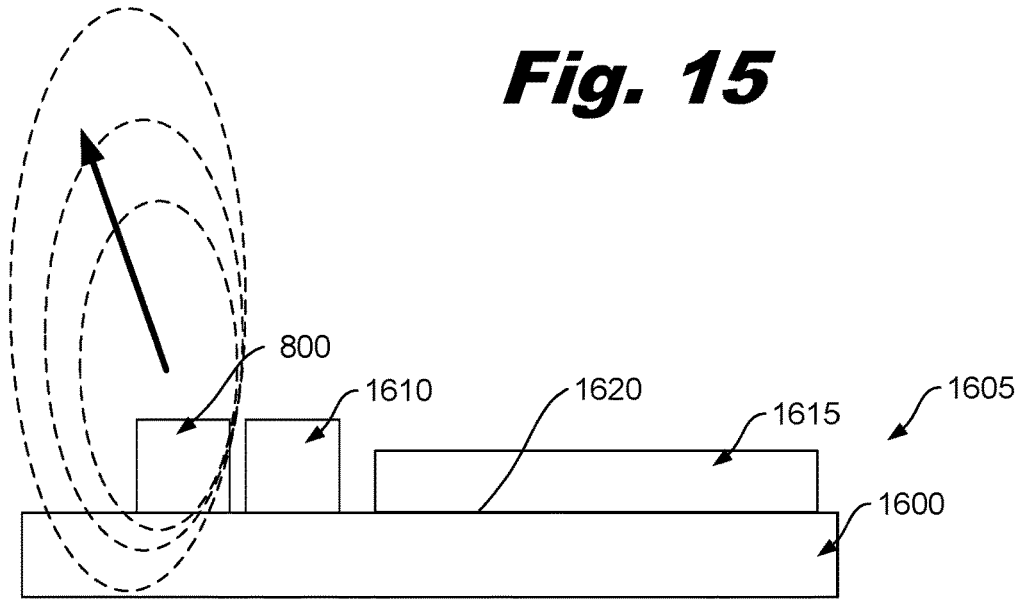
FIG. 16a depicts an example of a magnetically conductive, electrically insulating material located on a shield layer in accordance with the disclosure.

FIG. 16a depicts an example of antenna 800 on a substrate 1600 on a shield layer 1605 of the capacitance module. In this example, MCEI material 1610 separates the antenna 800 from the electrically conductive metal 1615 or other metal used on the same surface 1620 of the substrate as the antenna 800. The MCEI material 1610 may adequately shield the metal 1615 deposited on the shield substrate 1600 to reduce and/or eliminate eddy currents from forming in the metal 1615 from the magnetic field of the antenna 800.

Figure 16B:
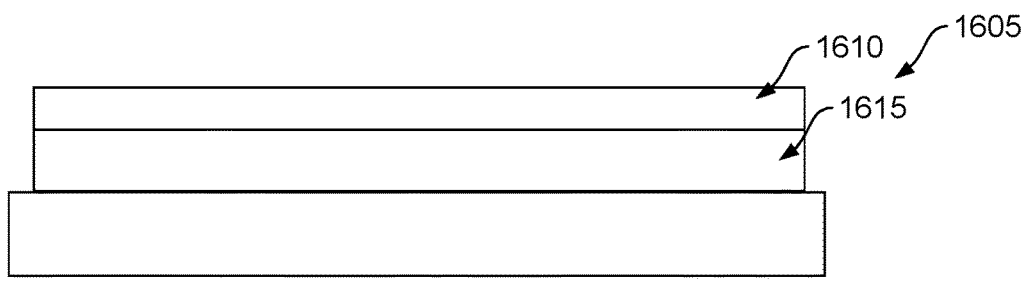
FIG. 16b depicts an example of a magnetically conductive, electrically insulating material located on a shield layer in accordance with the disclosure.
Figure 16C:
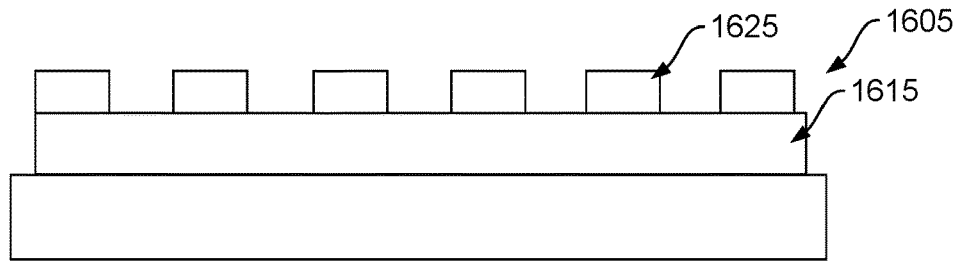
FIG. 16c depicts an example of segmented magnetically conductive, electrically insulating material located on a shield layer in accordance with the disclosure.

FIG. 16b depicts an example of a MCEI material 1610 on a conductive material 1615 of a shield layer. FIG. 16c depicts an example of segmented MCEI material 1625 on a conductive material 1615 of a shield layer 1605. In the examples of FIGS. 16a and 16b, the MCEI material may be put on the electrically conductive material of the shield layer through a type of deposition process, an additive manufacturing process, a bonding process, another type of process, or combinations thereof.

Figure 17:
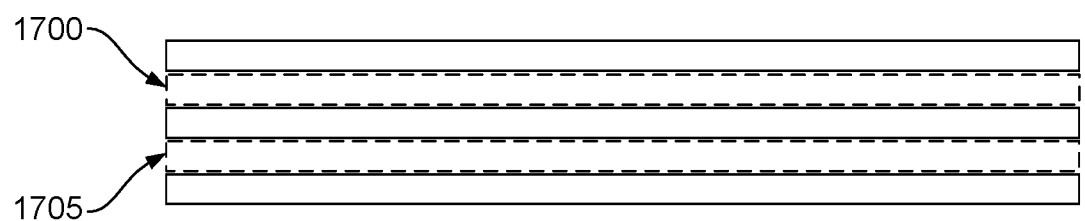
FIG. 17 depicts an example of a segmented magnetically conductive, electrically insulating material in a capacitance module in accordance with the disclosure.
Figure 18:
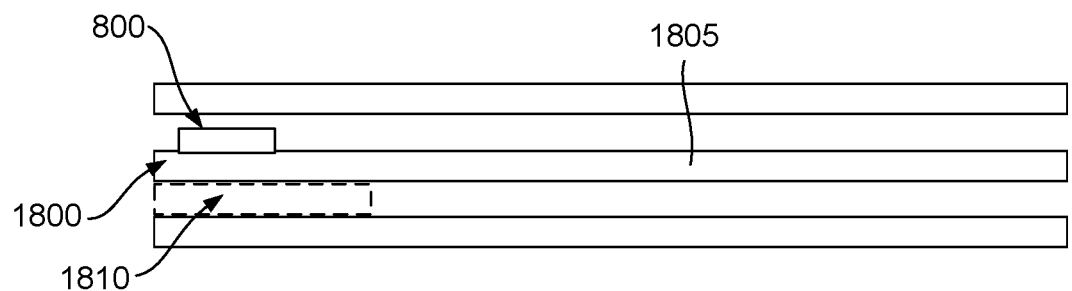
FIG. 18 depicts an example of a magnetically conductive, electrically insulating material on a different layer than an antenna, but within a proximity of the antenna in accordance with the disclosure.

FIG. 17 depicts an example where multiple dielectric layers 1700, 1705 of the stack of layers are made of MCEI material. FIG. 18 depicts an example of an antenna 800 deposited on a surface 1800 of substrate 1805 of a capacitance module and MCEI material 1810 is deposited below the substrate 1805 where the antenna 800 is located. However, just a portion of the area on that layer contains the MCEI material 1810. In this example, the MCEI material 1810 is limited to just within a region in proximity to the antenna 800.

Figure 19:
FIG. 19 depicts an example of segmented magnetically conductive, electrically insulating material in accordance with the disclosure.

FIG. 19 depicts an example of segmented MCEI material 1900 on a layer in a stack of layers in a capacitance module. In this example, the segmented MCEI material 1900 is located adjacent to the shield layer 1910. In some examples, a segmented MCEI barrier may provide enough eddy current reduction and/or elimination in the shield barrier to reduce and/or eliminate enough electrical interference at the capacitance electrodes to obtain desired capacitance measurements. While the example of FIG. 19 depicts the segmented MCEI material is a specific place, segmented MCEI material may be placed in any appropriate location within the capacitance module. For example, the segmented MCEI material may be adjacent the shield layer, the capacitance sensor layer, the capacitance reference surface, a component layer, a dielectric layer, on different layers, on an edge of a layer, in the middle of a layer, another location, or combinations thereof.

Figure 20:
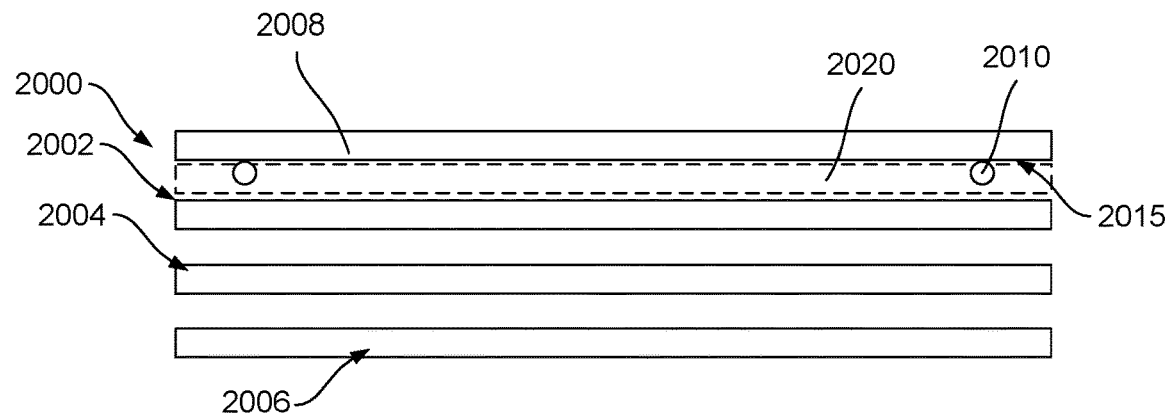
FIG. 20 depicts an example of a magnetically conductive, electrically insulating material adjacent an underside of a capacitance reference surface in accordance with the disclosure.

FIG. 20 depicts an example of a capacitance module 2000. In this example, the capacitance module 2000 includes a first capacitance sensor layer 2002 having at least one capacitance electrode and a second capacitance sensor layer 2004 having at least one capacitance electrode. In this example, the capacitance module 2000 also includes a shield layer 2006.

Also in this example, a capacitance reference surface 2008 is placed over the capacitance module 2000. The capacitance module 2000 also includes an antenna 2010 positioned between the first capacitance sensor layer 2002 and the capacitance reference module 2008. In this example, the antenna 2010 is located adjacent to the underside 2015 of the capacitance reference surface 2008. The capacitance module 2000 may be adhered to the underside 2015 of the capacitance reference module 2008 with a binding material 2020. In this example, the binding material 2020 may surround the antenna 2010.

In some cases, the binding material 2020 may be an MCEI material. In such an example, the binding material 2020 may focus the magnetic field through the capacitance reference surface 2008 and/or away from the shield layer 2006. In this example, the binding material and/or MCEI material focuses the magnetic field of the antenna away from the capacitance electrodes.

Figure 21:
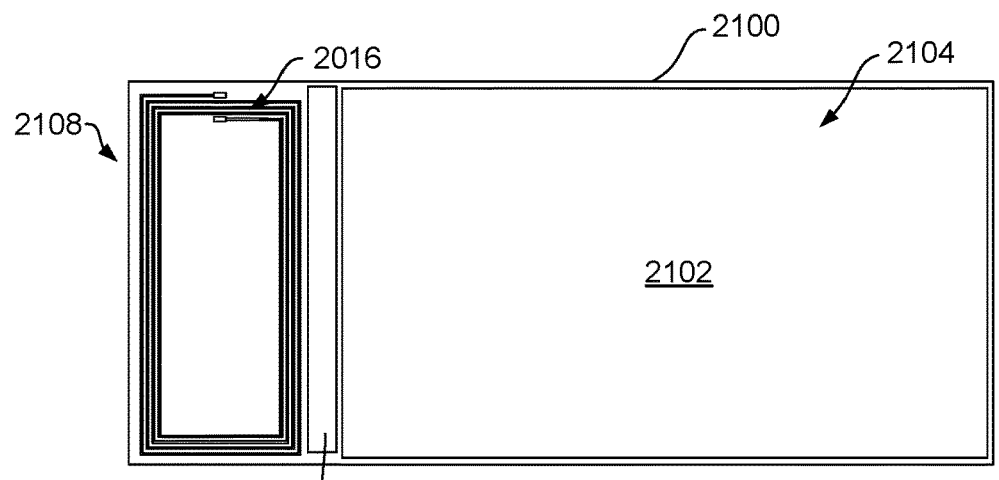
FIG. 21 depicts an example of a shield layer with an antenna in accordance with the disclosure.

FIG. 21 depicts an example of a substrate 2100 with an electrically conductive shield 2102 in a first area 2104 of a surface of the substrate 2100. An antenna 2016 is in a second area 2108 of the surface of the substrate 2100. An MCEI material 2110 is located on the surface of the substrate 2100 between the electrically conductive shield 2102 and the antenna 2016. In this example, the MCEI material may cause the magnetic field of the antenna to be redirected away from the electrically conductive shield, thereby eliminating, or at least reducing, the eddy currents from being induced in the electrically conductive shield.

Figure 22:
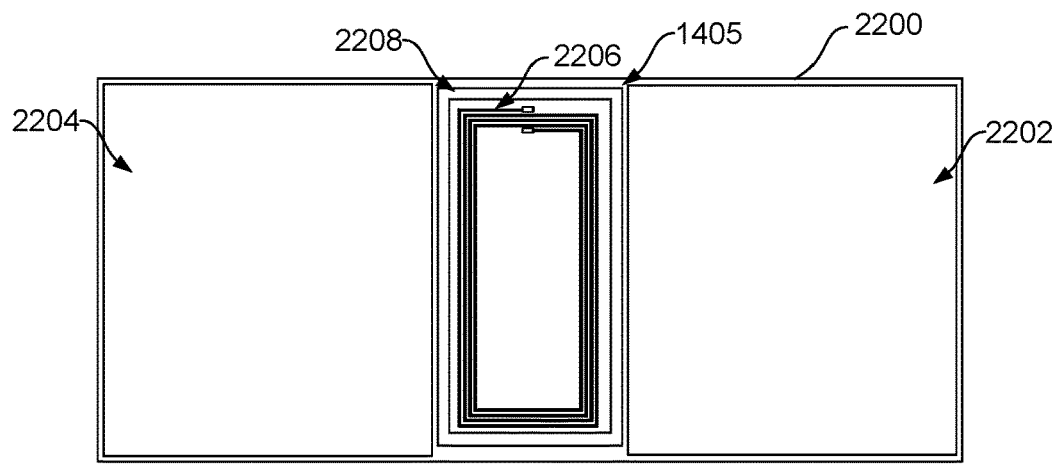
FIG. 22 depicts an example of a shield layer with an antenna in accordance with the disclosure.

FIG. 22 depicts an example of a substrate 2200 with an electrically conductive shield material in a first area 2202 in a surface of the substrate 2200, an electrically conductive shield material in a second area 2204 of the substrate, and an antenna 2206 located between the first area 2202 and the second area 2204. An MCEI barrier 2208 is located between the antenna 2206 and the first area 2204 and also between the antenna 2206 and the second area 2204.

Figure 23:
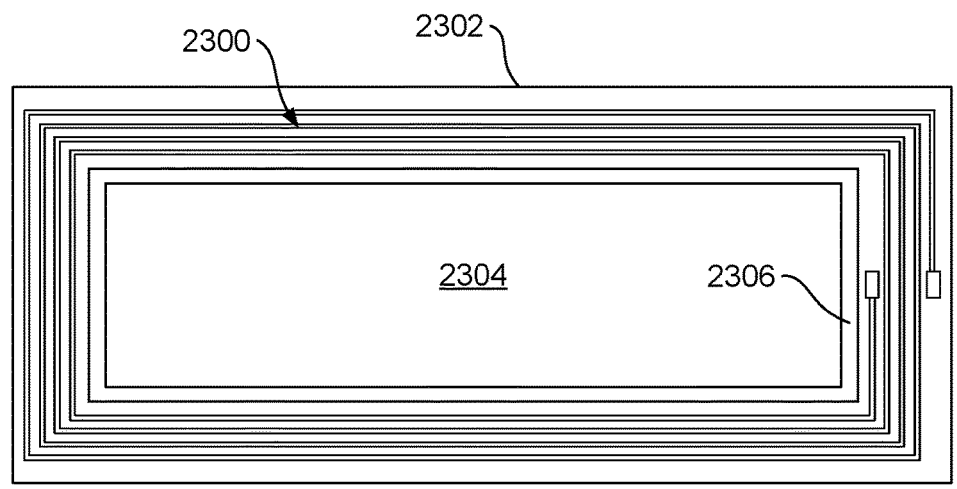
FIG. 23 depicts an example of a shield layer with an antenna in accordance with the disclosure.

FIG. 23 depicts an example of an antenna 2300 on a substrate 2302. In this example, the antenna 2300 surrounds an electrically conductive shield 2304. An MCEI barrier 2306 separates the electrically conductive shield 2304 from the antenna 2300. In this example, the MCEI barrier has a ring shape, but, in other examples, any appropriate shape may be used in accordance with the principles of the present disclosure.

Figure 24:
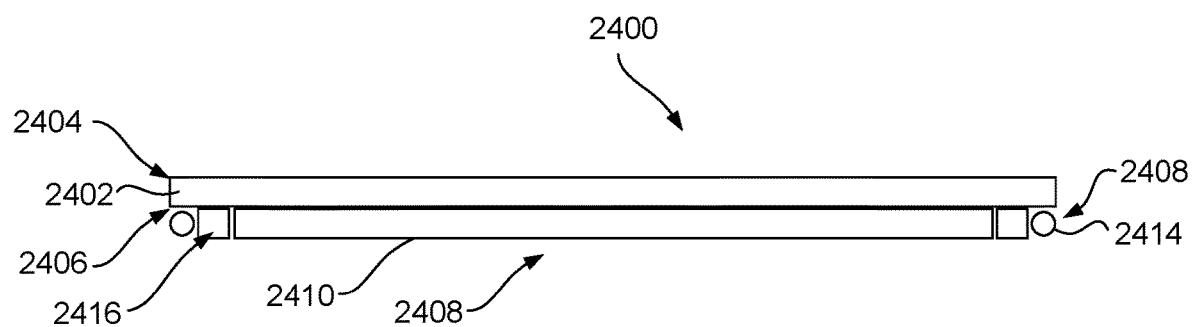
FIG. 24 depicts an example of a shield layer with an antenna in accordance with the disclosure.

FIG. 24 depicts an example of a capacitance module 2400. In this example, a first layer 2402 has at least one capacitance electrode deposited on at least one of a first surface 2404 of the first layer 2402, a second surface 2406 of the first layer 2402, or combinations thereof.

The second layer 2408 includes an electrically conductive shield 2410 located in a first portion of the second layer 2408. The second layer 2408 also includes an antenna 2414 and MCEI material 2416 located between the antenna 2414 and the electrically conductive shield 2410.

In the illustrated example, the magnetic field from the antenna 2414 may pass through the layer 2404 having the capacitance electrodes. In some cases, the magnetic field may pass through the capacitance electrodes on the layer 2404. The MCEI material 2416 may prevent or reduce the formation of eddy currents in the electrically conductive shield 2410.

Figure 25:
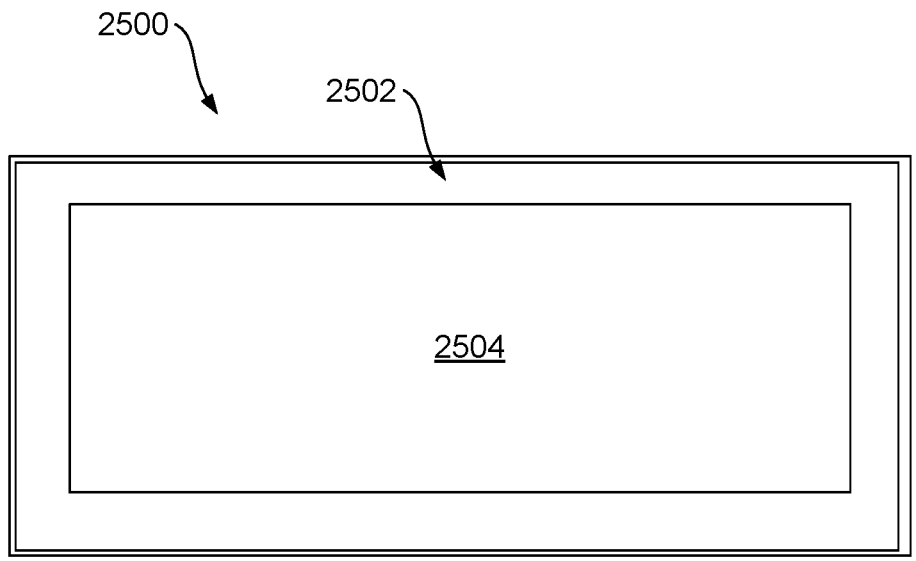
FIG. 25 depicts an example of a shield layer with an MCEI material in accordance with the disclosure.
Figure 26:
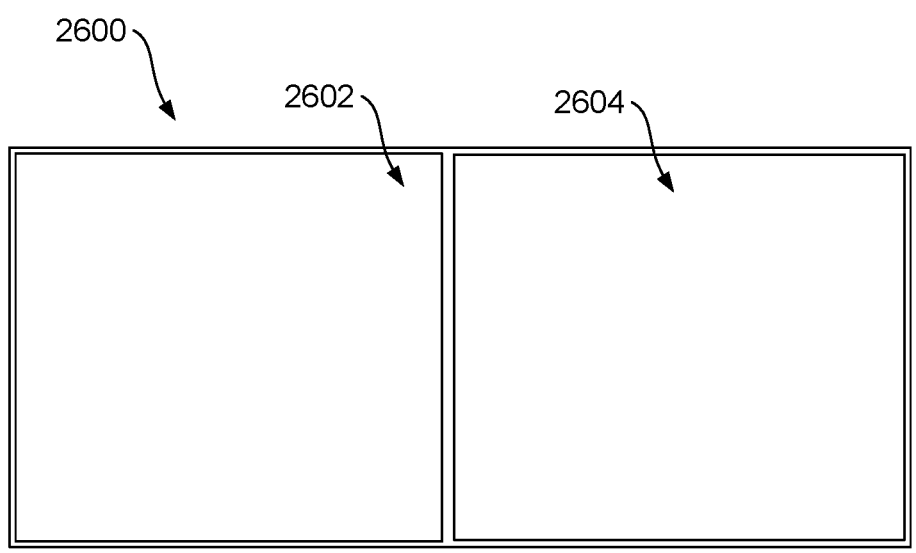
FIG. 26 depicts an example of a shield layer with an MCEI material in accordance with the disclosure.

FIG. 25 depicts an example of a layer 2500 with an MCEI outer area 2502 and an electrically conductive shield inner area 2504. FIG. 26 depicts an example of a layer 2600 with an MCEI area 2602 and an electrically conductive shield area 2604. In some cases, the MCEI material may be placed on the same layer as the electrically conductive shield. The placement of the MCEI material may correspond to the locations of an antenna on another layer of the capacitance module or correspond to inductive sources that are external to the capacitance module.

While the examples above have been described relating to specific types of antennas, any appropriate antenna may be used in accordance with the principles described herein. For example, the antenna may be a Wi-Fi antenna, a directional antenna, a semi-directional antenna, an omnidirectional antenna, an inductive-type antenna, a near-field antenna, RFID antenna, Bluetooth antenna, a passive antenna, an active antenna, an initiator antenna, a dipole antenna, a monopole antenna, a loop antenna, capacitive antenna, another type of antenna, or combinations thereof.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
a stack of layers, the stack including:
a first substrate; and
at least one capacitance sensing electrode on the first substrate; and
an antenna incorporated into the stack of layers, the antenna having a first side, a second side opposite the first side, and an underside;
a magnetically conductive, electrically insulating material incorporated into the capacitance module;
at least a portion of the magnetically conductive, electrically insulating material is positioned adjacent to the underside of the antenna and is positioned adjacent at least one of the first side and the second side;
wherein the magnetically conductive, electrically insulating material is positioned between the antenna and the least one capacitance sensing electrode;
wherein the antenna, the at least capacitance sensing electrode, and the magnetically conductive electrically insulating material are on the same layer.

2. The module of claim 1, wherein the antenna is an inductive-type antenna.

3. The module of claim 1, wherein the antenna is a near field antenna.

4. The module of claim 1, wherein the magnetically conductive, electrically insulting material is a dielectric layer of the stack of layers.

5. The module of claim 1, wherein the magnetically conductive electrically insulating material is positioned adjacent to the first side of the antenna and the second side of the antenna.

6. The module of claim 1, wherein the magnetically conductive electrically insulating material forms an outer ring around the antenna.

7. The module of claim 1, wherein the magnetically conductive electrically insulating material forms an inner ring adjacent to an inside surface of the antenna.

8. The module of claim 1, wherein the magnetically conductive electrically insulating material is segmented.

9. The module of claim 1, wherein the magnetically conductive electrically insulating material surrounds an entire perimeter of the antenna.

10. The module of claim 1, wherein the magnetically conductive electrically insulating material forms a trough with an inner channel and at least a portion of the antenna is disposed within the inner channel.

11. The module of claim 1, furthering comprising an electrically conductive shield; wherein the magnetically conductive electrically insulating material is located on the same layer as the electrically conductive shield.

12. A capacitance module, comprising:
a stack of layers, the stack including:
   a substrate;
   at least one capacitance sensing electrode on the substrate;
   a near field antenna incorporated into the stack of layers; and
   a magnetically conductive, electrically insulating material incorporated into the stack;
   the near field antenna being incorporated into the stack of layers, the near field antenna having a first side, a second side opposite the first side, and an underside;
   at least a portion of the magnetically conductive, electrically insulating material is positioned adjacent to the underside of the antenna and is positioned adjacent at least one of the first side and the second side;
   wherein the magnetically conductive, electrically insulating material is positioned between the antenna and the least one capacitance sensing electrode;
   wherein the antenna, the at least capacitance sensing electrode, and the magnetically conductive electrically insulating material are on the same layer.

13. The module of claim 12, wherein the near field antenna is on a same substrate with the at least one capacitance sensing electrode.

14. The module of claim 12, wherein the magnetically conductive, electrically insulating material partially envelops the near field antenna.

15. The module of claim 12, wherein the magnetically conductive, electrically insulting material is a dielectric layer.

16. An electronic device, comprising:
a stack of layers, the stack including:
   a first layer;
   a second layer;
   a magnetically conductive, electrically insulating material incorporated between the first layer and the second layer; and
   at least one capacitance electrode on either the first layer, the second layer, or both;
   the near field antenna being incorporated into the stack of layers, the near field antenna having a first side, a second side opposite the first side, and an underside;
   at least a portion of the magnetically conductive, electrically insulating material is positioned adjacent to the underside of the near field antenna and is positioned adjacent at least one of the first side and the second side;
   wherein the magnetically conductive, electrically insulating material is positioned between the near field antenna and the least one capacitance sensing electrode;
   wherein the near field antenna, the at least capacitance sensing electrode, and the magnetically conductive, electrically insulating material are on the same layer.

17. The device of claim 16, wherein the first layer is a capacitance reference surface.

18. The device of claim 16, wherein a near field antenna is deposited on a same layer as the magnetically conductive electrically insulating material.

* * * * *